United States Patent [19]

Gavrilovich

[11] Patent Number: 4,484,030
[45] Date of Patent: Nov. 20, 1984

[54] METHOD AND APPARATUS FOR IDENTIFYING FAULTY COMMUNICATIONS CIRCUITS

[75] Inventor: Charles D. Gavrilovich, Naperville, Ill.

[73] Assignee: AT&T Bell Laboratories, Murray Hill, N.J.

[21] Appl. No.: 369,974

[22] Filed: Apr. 19, 1982

[51] Int. Cl.³ .................... H04M 15/38; H04M 3/22
[52] U.S. Cl. ......................... 179/8 A; 179/7.1 R; 179/17.2 C; 179/175.3 F
[58] Field of Search ............. 179/8 A, 7.1 TP, 7.1 R, 179/7 MM, 7 R, 8 R, 18 BS, 18 BA, 175.2 C, 175.2 R, 175.3 F, 175.3 A, 175.3 R, 27 G; 371/68, 67; 364/200, 900

[56] References Cited

U.S. PATENT DOCUMENTS

| | | | |
|---|---|---|---|
| 3,570,008 | 3/1971 | Downing | 340/172.5 |
| 4,103,149 | 7/1978 | Linden et al. | 235/92 TE |
| 4,165,447 | 8/1979 | Bertoglio et al. | 179/7.1 R |
| 4,371,758 | 2/1983 | Ulrich | 179/8 A |

FOREIGN PATENT DOCUMENTS

| | | |
|---|---|---|
| 2728942 | 11/1978 | Fed. Rep. of Germany . |
| 2348612 | 11/1977 | France . |
| 1502415 | 3/1978 | United Kingdom . |
| 2029670 | 3/1980 | United Kingdom . |
| 1565489 | 4/1980 | United Kingdom . |

OTHER PUBLICATIONS

Ebner, G. C., and Haenschke, D. G.: Network Management, Bell System Technical Journal, vol. 62, No. 7, part 3, pp. 2239-2260, Sep. 1983.
Telesciences Corporation: Autrax ® Automatic Traffic Recording Terminal (Brochure).
A. H. Budlong et al.: "Control Systems", The Bell System Technical Journal, vol. 56, No. 2, pp. 135-179, Feb. 1977.
D. H. Carbaugh et al.: "No. 1 ESS Call Processing", The Bell System Technical Journal, vol. 43, No. 5, pt. 2, pp. 2483-2531, Sep. 1964.
T. V. Greene, et al.: "No. 4 ESS Network Management and Traffic Administration", The Bell System Technical Journal, vol. 56, No. 7, pp. 1169-1202, Sep. 1977.
W. Ulrich et al.: "Translations in the No. 1 ESS", The Bell System Technical Journal, vol. 43, No. 5, pt. 2, pp. 2533-2573, Sep. 1964.

Primary Examiner—Stafford D. Schreyer
Attorney, Agent, or Firm—P. Visserman

[57] ABSTRACT

An arrangement for detecting defective communications circuits in a telecommunications system. Communications circuits are arranged in groups according to destination. Unacknowledged communications are counted for each group. A group whose incidence of such unacknowledged communications is especially high is likely to contain one or more defective communication circuits. More detailed measurements, including a count of attempts to use each member of such a group, are then taken to identify individual defective communication circuits. A communication circuit having an especially high count of attempts to use is likely to be defective.

32 Claims, 13 Drawing Figures

FIG. 4
| ATTEMPT COUNT 1st TRUNK | USAGE COUNT 1st TRUNK | UNANSWERED CALL COUNT 1st TRUNK |
|---|---|---|
| ATTEMPT COUNT mth TRUNK | USAGE COUNT mth TRUNK | UNANSWERED CALL COUNT mth TRUNK |
| ATTEMPT COUNT nth TRUNK | USAGE COUNT nth TRUNK | UNANSWERED CALL COUNT nth TRUNK |
140, 141, 142, 143
FIG. 5
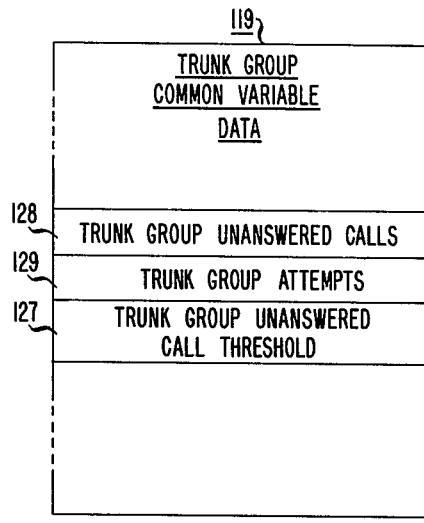
119, 128, 129, 127
FIG. 6
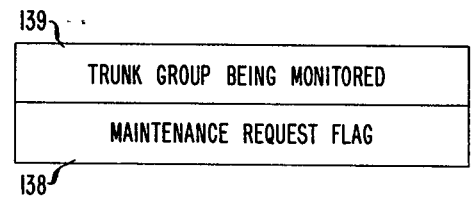
139, 138

METHOD AND APPARATUS FOR IDENTIFYING FAULTY COMMUNICATIONS CIRCUITS

TECHNICAL FIELD

This invention relates to a method and apparatus for identifying defective functional circuits in a communication network and more specifically, for identifying defective internodal communication circuits in a communication network.

BACKGROUND OF THE INVENTION

Increasing attention has been paid in recent years to the automation of trouble detection in telecommunication networks. Much of the attention has been devoted to the common circuitry of each node which is used by all communications through the node. Trouble analysis of the large number of functional circuits which are used to interconnect the nodes of a network, generally considered to be less critical than the common circuitry, is much less developed. Unlike much of the common circuitry, these circuits can rarely be monitored continuously in an efficient and cost effective manner.

In telecommunication systems, the functional circuits which interconnect the nodes of a network are called trunks and are customarily used as shared facilities which are made available to different customers of the network at different times. Normally, the trunks interconnecting any two nodes are grouped into trunk groups of varying sizes. When a connection between customers associated with different nodes of the network is to be set up, any available trunk from the group(s) interconnecting these nodes may be selected for the connection.

Occasionally, a marginal condition, such as excessive noise, occurs on a trunk; this condition is not detected by routine operational tests but is noticeable to the customer. When such a trunk is engaged in a call, the customer engaged in the connection detects the unacceptable condition, terminates the call after a very short time, and attempts to place the call again. Since such trunks are used for only a short time on each connection attempt, i.e., have short holding times, they become repeatedly available for customer use and are responsible for an inordinate number of unsuccessful call attempts. In telephone systems, these are sometimes referred to as "killer trunks" because of the excessive number of unsuccessful call attempts attributable to each such trunk.

The need to detect faulty trunks rapidly is particularly acute in private networks, for example, those dedicated to one large customer such as a corporation or government agency. Such networks typically have a relatively small number of heavily loaded trunks in a group. Because of such a deficiency, the individual using such a network is often subjected to the use of the same defective trunk several times before a successful call can be completed. Even when a customer complains about a bad connection, it is frequently difficult to associate the complaint with a specific trunk or trunk group.

Generally, many or all trunks of a group share some common circuits. All of the trunks in a group share a common connected node. When there is trouble in such common circuitry, or in the connected node, many calls distributed over a number of trunks are not completed successfully. It is important to be able to distinguish this type of trouble condition from trouble in circuitry individual to one trunk, since different remedial action is required.

Off-line facilities are commercially available for recording the number of times that a given trunk is seized (attempt counts) and for recording the percentage of time that a given trunk is being used (percent of usage or occupancy). From these records, it is possible to identify trunks which have an unusually low average holding time (ratio of usage to attempt count) and this will give an indication of defective trunks. However, these prior art systems are usually adapted to take measurements for only a small fraction of the trunks connected to a node since special equipment is required for every trunk that is monitored. The cost of monitoring all trunks with such equipment would be prohibitive. No good overall mechanism exists for identifying which trunks or trunk groups should be measured. Since meaningful measurements must usually cover several busy periods, a delay of weeks or months is encountered before the performance of every trunk connected to a node can be meaningfully measured with the use of such dedicated systems.

Furthermore, these prior art systems are restricted to use with trunks which provide direct circuit access to each trunk and cannot be used with trunks which carry multiplexed communications such as digital trunks or analog carrier trunks, unless such trunks are adapted to provide such access.

SUMMARY OF THE INVENTION

In accordance with this invention, a program-controlled system controlling a node of a network and having groups of functional circuits used for communicating between the nodes of such a network detects unacknowledged communications in each of these groups. The number of unacknowledged communications for each group of functional circuits is measured. A group whose measure of unacknowledged communications is substantially higher than that of similar size groups is identified as a group containing functional circuits recurrently engaged in unsuccessful internodal communications. In one embodiment, this number can be measured over an interval of a given unit of time and will thus represent the rate of such unacknowledged communications over such a unit of time.

In one embodiment, such a number can be accumulated in a counter in storage associated with each such group of functional circuits. Advantageously, such counts may be displayed on a maintenance console of the system identifying groups of functional circuits recurrently engaged in unsuccessful communications.

Advantageously, when a group has been identified as recurrently engaged in unacknowledged communications, the activity of the group can be further monitored by taking attempt counts over a unit of time for each functional circuit within that group. A functional circuit having a much higher attempt count than that of other members of the group is identified as one that is likely to be defective. Routine remedial action may be taken after a problem circuit has been so identified.

Further, in accordance with this invention, a threshold may be set up for each group of functional circuits. If a group has more unacknowledged attempts in a unit of time than this threshold, the group can be automatically monitored by means of further traffic measurements of its individual functional circuits.

Further, in accordance with this invention, three types of traffic measurements of individual functional circuits in a group can be taken: counts of total attempts, counts of unacknowledged communications, and measurements of percent of usage. These counts and measurements can be taken for a unit of time for all the functional circuits in a group. Advantageously, if the total number of attempts for any one functional circuit is substantially higher than that of others in the group, or if the number of unacknowledged communications on any one functional circuit is substantially higher than that of others in the group, or if the percent of usage of any one functional circuit is substantially less than that of other functional circuits in the group with a comparable number of total attempts, that functional circuit is identified as defective. It is a further advantage that if the measurements of individual functional circuits show relatively uniform poor results, equipment common to the group is likely to be defective.

An example of the type of program-controlled system to which this invention can be applied is a telecommunication system. The network of such a system is a telecommunication network. The internodal communication circuits are trunks. In one exemplary scheme, the number of unacknowledged attempts and total attempts are counted on every group of outgoing trunks in a telecommunications network. When the number of unacknowledged attempts exceeds a predetermined threshold for that trunk group, individual trunk measurements are taken for the trunks in that group. A count of attempts to use each trunk in a group being monitored may be coupled with optional measurements of the percent of usage and/or of a count of unacknowledged communications for each trunk in such a group. Advantageously, a trunk which shows a high attempt rate, or high unacknowledged communication rate, or low percent of usage compared with other trunks having a similar attempt rate is identified as defective. Further, if the measurements of the trunks of a group show relatively uniform poor results there is likely to be a defect in the common facility of the group. If a subgroup of trunks, associated with specific equipment shared by that subgroup shows uniform poor results, there is likely to be a defect in such specific equipment. If measurements on trunk groups from many different nodes to one node of a network all indicate a high incidence of unacknowledged attempts, there is likely to be a defect at that node.

The rate of unacknowledged calls is an especially sensitive indicator of trouble in the internodal facilities of a communications network. The invention takes advantage of this property to identify specific problems.

BRIEF DESCRIPTION OF THE DRAWING

The invention may be better understood with reference to the following description taken in conjunction with the drawing in which:

FIG. 4 shows the memory layout for accumulating attempt, unanswered call, and usage counts for the individual trunks within a trunk group;

FIG. 5 shows the memory layout of a counter used to accumulate attempt and unanswered call data for a trunk group;

FIG. 6 shows the memory layout of the data to identify a trunk group being monitored;

DETAILED DESCRIPTION

The principles of this invention are illustrated in the context of a program-controlled telephone switching system such as the Western Electric No. 1 Electronic Switching System, (No. 1 ESS). This switching system is in commercial use and is described generally in "No. 1 Electronic Switching System", *The Bell System Technical Journal,* Vol. 43, No. 5, Parts 1 and 2, September 1964, and in the U.S. Pat. No. 3,570,008 of R. W. Downing, H. F. May, F. F. Taylor, and W. Ulrich. An improved processor for use with this system is described in "1A Processor", *The Bell System Technical Journal,* Vol. 56, No. 2, February 1977. These disclosures and the citations referred to therein may be consulted for a complete understanding of the construction and operation of a typical telephone switching system.

Figure 1:
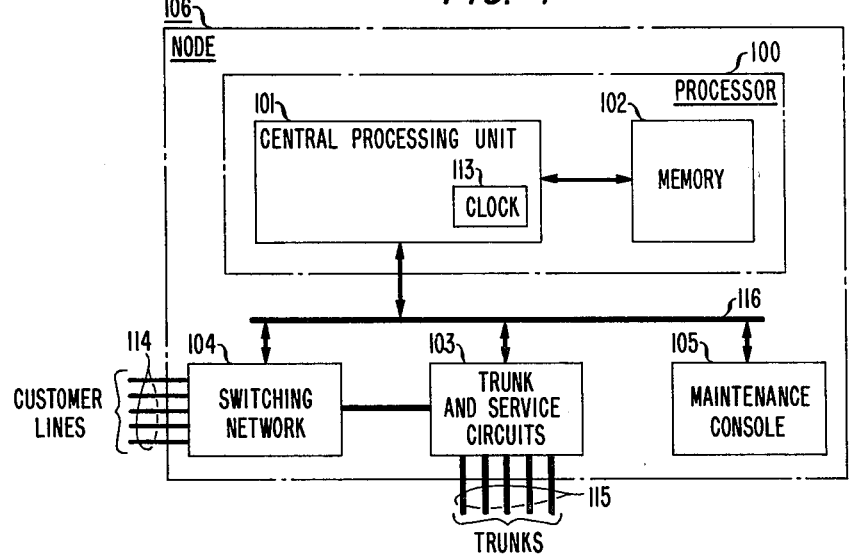
FIG. 1 represents the major subassemblies of a typical switching system for use in a communications network, in block diagram form.

FIG. 1 is a high level block diagram of such a telephone switching system. It represents one switching system or node 106, of a telephone network. The system comprises a program-controlled processor 100 and input/output equipment 103, 104, and 105.

Trunk and service circuits 103 includes trunk circuits associated with trunks 115 which are connected to other switching systems. Service circuits include transmitter circuits for transmitting a called number to another switching system and dialing receiver circuits for accepting dialed information from a customer. Switching network 104 is used to make connections between customer lines 114 served by this switching system, and trunks and service circuits 103; between customer lines 114; and between trunk and service circuits 103. A connection to a trunk circuit 103 which has been set to the proper state forms a connection to the associated trunk 115. Trunk and service circuits 103, switching network 104 and its connected customer lines 114, and maintenance console 105 are controlled by processor 100 via a bus 116.

When a customer picks up his telephone, his line is connected by switching network 104 to a dialing receiver in 103. The processor receives data indicating the customer's dialed request via the dialing receiver. If this request is interpreted to indicate a request for a connection to a customer served by another switching system, the processor selects a trunk circuit associated with a trunk connected to that other switching system. A transmitter circuit in 103 is then selected by the processor and connected to the selected trunk circuit in 103 by switching network 104. After the called number has been transmitted by the transmitter circuit, the calling customer is connected by switching network 104 to the selected trunk circuit. The calling customer is then able to talk to the called customer as soon as the other switching system has made the appropriate connections in its own switching network and the called customer picks up his telephone. All of the switching network connections, and trunk and service circuit state changes are accomplished under the control of processor 100.

The switching network 104, the trunk circuits and service circuits, including dialing receivers and transmitter circuits, are well-known in the art and have been described, for example in "No. 1 Electronic Switching System", *The Bell System Technical Journal*, Vol. 43, No. 5, Parts 1 and 2, September, 1964.

Maintenance console 105 is used to communicate with personnel maintaining and controlling the switching system. Information concerning traffic and trouble conditions is displayed or recorded at the maintenance console, and commands to the switching system are entered there. Maintenance consoles are well known in the field; one such console is described in A. H. Budlong, et al., "Control System", *The Bell System Technical Journal*, Vol. 56, No. 2, pp. 135-179, February 1977.

A program-controlled processor 100 is used to control a switching system. Any of a number of well-known processors may be used to perform this function. One specific example of such a processor is described in "The 1A Processor", *The Bell System Technical Journal*, Vol. 56, No. 2, February, 1977. Such a processor comprises a central processing unit 101 and a memory 102. Memory 102 stores a group of programs each comprising a group of instructions which can be directly interpreted by central processing unit 101. The central processing unit 101 executes such programs by carrying out functions such as the following in response to instructions read from memory 102: sending control and output signals to and receiving input data from input/output equipment; storing data read from memory 102 in internal register storage; writing the contents of internal register storage into memory 102; adding the contents of a location of memory 102 to the contents of internal register storage; comparing the contents of a location of memory 102 with the contents of internal register storage; transferring to alternate programs in response to the result of such comparisons, or in response the state of internal register; transferring unconditionally to alternate programs. These functions are well known and described more fully in the previously cited *The Bell System Technical Journal*, Vol. 56, No. 2, February, 1977, and *The Bell System Technical Journal*, Vol. 43, No. 5, Parts 1 and 2 September, 1964. The central processing unit 101 also comprises a clock 113. The clock provides basic timing. This basic timing can be used under the control of an executive control program stored in memory 102, in conjunction with data stored in memory 102, to derive time intervals of arbitrary duration.

Figure 2:
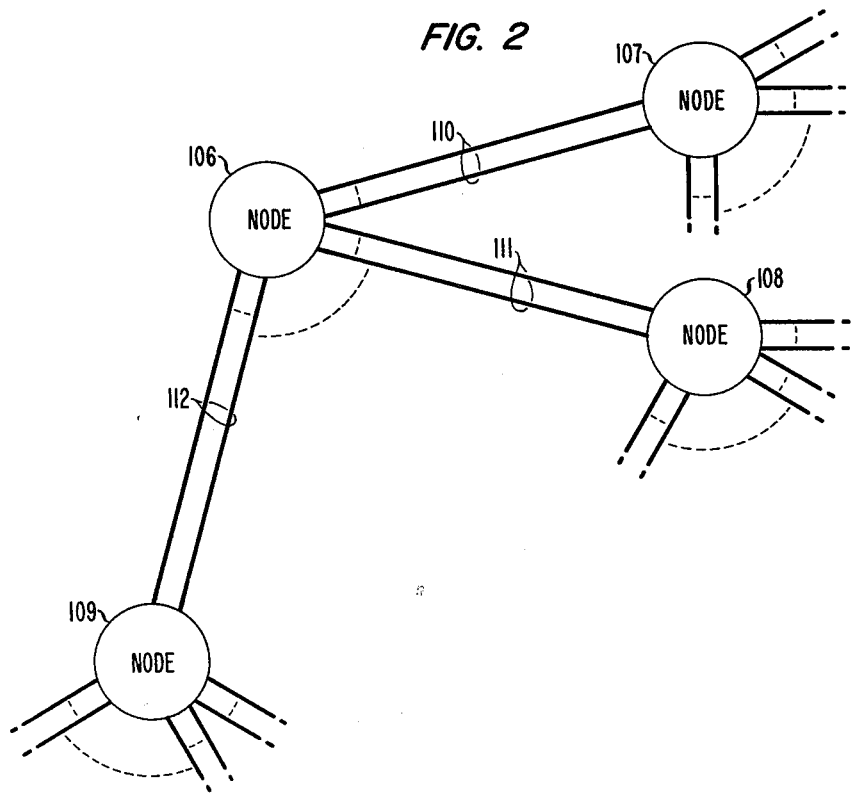
FIG. 2 represents a communications network having several nodes.

FIG. 2 shows a portion of a telephone network, of which node 106 shown in FIG. 1 is one node, and nodes 107, 108, and 109 are others which may be substantially identical to node 106. The nodes are partially interconnected, each node being connected to at least one of the others. The interoffice trunks which are used as the internodal communication facilities are grouped into trunk groups, all members of which interconnect the same two nodes. For example, all members of trunk group 110 interconnect nodes 106 and 107, all members of trunk group 111 interconnect nodes 106 and 108, and all members of trunk group 112 interconnect nodes 106 and 109. Each node has a number of trunk groups connecting it with other nodes.

It is common practice in telephone systems to restrict the traffic on a given trunk group to one direction. For example, traffic originated by a customer served by node 106, and terminated to a customer served by node 107 would be routed over a trunk group such as 110 carrying only outgoing traffic from node 106. A corresponding incoming trunk group (not shown) would carry traffic in the reverse direction. Normal practice in telephone switching systems is to make the switching system connected to the outgoing end of a trunk responsible for the maintenance of that trunk; incoming trunks are then maintained by the switching system connected to the other end of the trunk.

Figure 3:
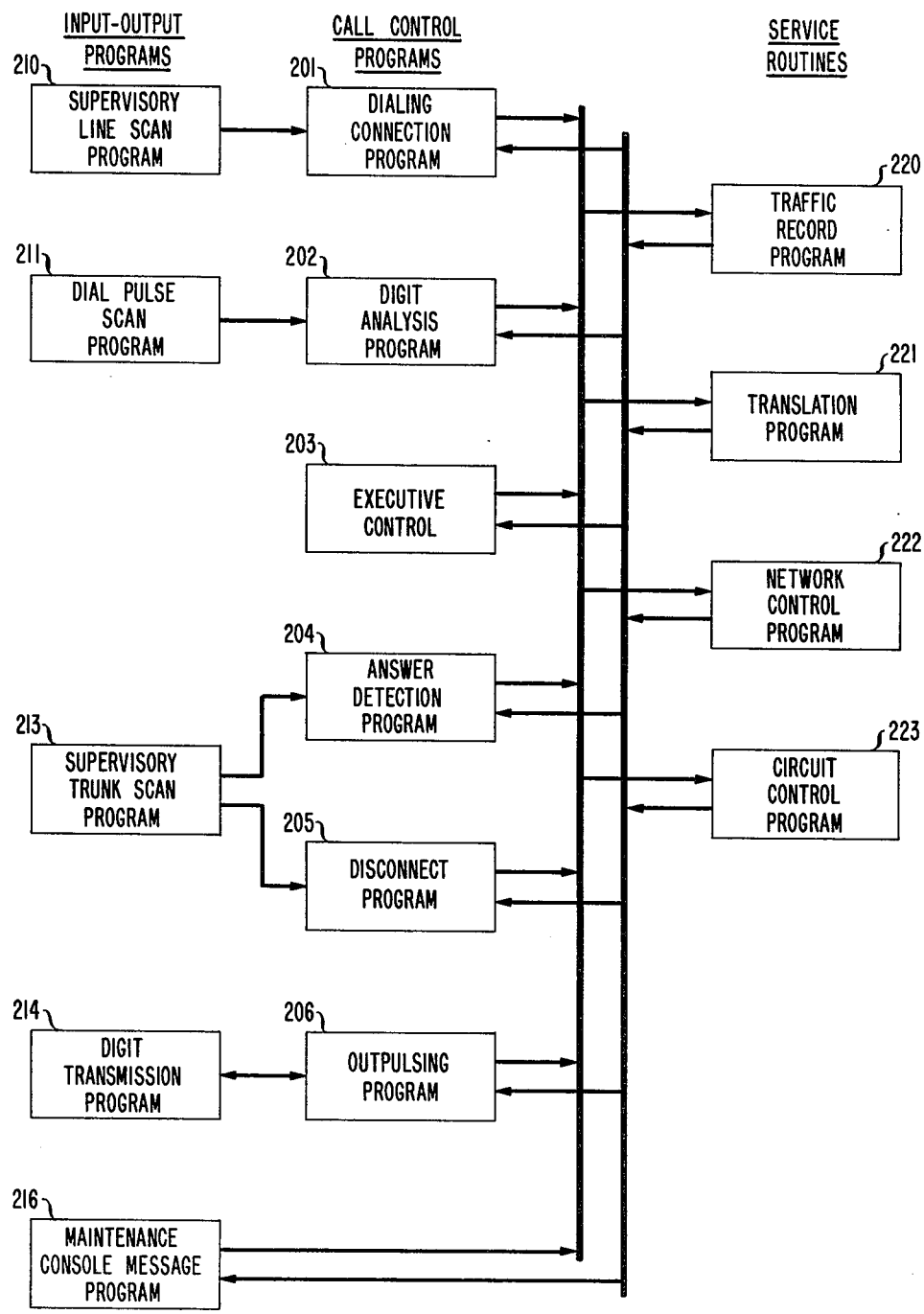
FIG. 3 shows a known program structure for processing telephone calls in a typical electronic telephone switching system.

Programs which can be executed by processor 100 to control the switching system to perform all the functions required to handle telephone calls, are known in the art. One such program is described in an article by D. H. Carbaugh, et al.: "No. 1 ESS Call Processing", *The Bell System Technical Journal*, Vol. 43, No. 5, Part 2, pp. 2483-2531, September, 1964, and is shown in general form in FIG. 3. FIG. 3 shows the programs involved in an outgoing call (a call from a customer line served by this switching system to a customer line served by a different switching system), the programs for taking traffic measurements, and the programs for communicating with the maintenance console. It is not necessary in this description to consider incoming calls (calls from customer lines served by a different switching system to a customer line served by this switching system) since the trunks carrying such calls are maintained by the connected switching system. Intra-office calls which do not use trunks are not considered.

The principles of this invention as described herein are also applicable to two way trunks. However, for the sake of convenience, the description refers only to one way trunks.

The switching system operates under the control of the prior art program outlined in FIG. 3. The central processing unit 101 executes this program in order to set up and take down telephone connections and carry out other functions necessary for the operation of a telephone switching system. The central processing unit 101 operates under the control of input/output programs 210, 211, 213, 214, and 216 to communicate with the input/output equipment 103, 104, 105. The central processing unit operates under the control of call control programs 201, 202, 203, 204, 205, and 206 when acccumulating and processing data necessary to detect the specific details of a customer's dialed request. In the course of executing the call control programs and the maintenance console message programs, the central processing unit will frequently execute service routines 220, 221, 222 and 223 in order to generate the data needed to control input/output equipment 103, 104, 105, to select appropriate lines and trunks, and to take necessary measurements of system performance. Each of the programs and routines shown in FIG. 3 comprise many subprograms or subroutines for controlling specific subtasks. Central processing unit 101 calls for the execution of a subroutine by executing a transfer instruction, either unconditionally, or in response to the result of a comparison, or as a result of the detection of a specific state in internal register storage within the unit. It will be understood that actions of programs, such as detecting, controlling, etc., described herein, are executed by processing 101 under program control.

The system under control of the program outlined in FIG. 3 operates in the following manner. An outgoing call starts when the switching system detects that a customer is off-hook. This detection is accomplished under control of supervisory line scan program 210 which periodically monitors circuits in the switching network 104 connected to the customer lines. When the processor has detected a request for service, it calls dialing connection program 201 which controls the network 104 to set up a connection between the originating customer and a dialing receiver circuit. In the course of executing program 201, the central processing unit also calls for the execution of translation program 221 which is used to select a dialing receiver that is currently available, network control program 222 which is used for selecting a path through a switching network between the originating customer and the dialing receiver, and circuit control program 223 which is used for setting up data required to control the state of a dialing receiver.

As the customer dials, the dialed number is collected under the control of dial pulse scan program 211. As digits are accumulated, the specific details of the customer's request and the completion of dialing are detected under the control of digit analysis program 202. When this stage of the call has been reached, the translation program 221 is executed to select a trunk group to the switching system specified by the first three digits of the dialed number, and to select an available outgoing trunk in that group. A path is set up in network 104, under the control of network control program 222, between a transmitter circuit in 103, adapted to transmit to the distant switching system the number of the called telephone customer, and the previously selected outgoing trunk. The outgoing trunk and transmitter are set to a correct initial state under the control of the circuit control program 223. The data for controlling the transmission of the called number to the called switching system is set up under the control of outpulsing program 206; the actual transmission of the digits is then carried out by the transmitter circuit in 103 under the control of digit transmission program 214. When the process of transmitting the called number to the called switching system has been completed, a connection is set up, under the control of network control program 222 between the calling customer and the previously selected outgoing trunk. Under the control of data generated by the circuit control program 223, the outgoing trunk circuit in 103 is set to an appropriate state in order to allow an answer by the called customer to be detected, and to allow the calling and called customers to communicate.

Subsequently, the state of the selected outgoing trunk is monitored by central processing unit 101 under the control of supervisory trunk scan program 213. If an answer by the called party is detected, the central processing unit calls for the execution of answer detection program 204, which controls the intitiation of timing for charging purposes. If the calling customer hangs up before an answer is detected, representing an unanswered or unacknowledged call, the central processing unit calls for the execution of disconnect program 205 which is used to control the restoration of the selected path in the switching network 104 and the selected outgoing trunk in 103 to an available state.

Central processing unit 101, under the control of an executive control program 203, is responsive to clock signals from clock 113, and uses these clock signals in conjunction with time records stored in memory to derive other signals at periodic intervals of time to initiate execution of appropriate programs. The periodic signals provide means for initiating such periodic functions as taking traffic usage measurements, one of the functions controlled by traffic record program 220. Periodically, the usage on trunks being measured is sampled. The usage is accumulated, for example, for an hour, and trunks are sampled, for example, every 100 seconds. Usage can then be expressed as the number of samples taken in which the trunk was busy (usage count), divided by 36, the number of samples in an hour.

The traffic record program 220 is also used for controlling the accumulation of counts of attempts in a trunk group; these counts are accumulated whenever central processing unit 101 under the control of the digit analysis program 202, detects the completion of dialing, and calls translation program 221 to control selection of an appropriate trunk group and trunk. After the trunk group and trunk have been selected, the central processing unit 101 executes a transfer to the appropriate subroutine of the traffic record program 220 in order to increment a counter associated with that trunk group.

Finally, a maintenance console message program 216 is executed whenever a message is to be sent to or received from the maintenance console 105. When an indication of possible trouble is detected by the processor 100, an appropriate maintenance message is sent to the console.

Extensive traffic measurements are commonly taken in telephone systems in order to operate the systems efficiently, to detect trouble conditions, and to provide data for engineering growth in trunk groups. The techniques for making such measurements are described in an article by T. V. Greene et al., "No. 4 ESS Network Management and Traffic Administration", *The Bell System Technical Journal*, Vol, 56, No. 7, pp. 1169–1202, September, 1977. This paper and the citations referred to therein may be consulted for a complete understanding of the techniques for making traffic measurements. Traffic measurements are made under the control of traffic record program 220.

Figure 11:
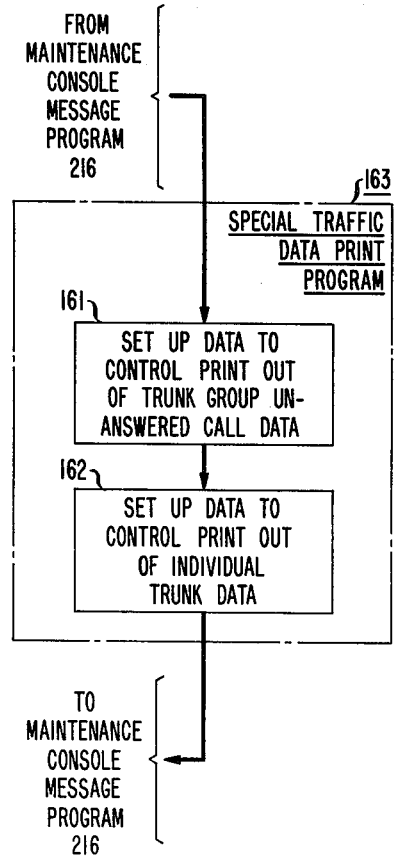
FIG. 11 is a flow chart of a program for setting up traffic data in order to print out data useful for identifying a possibly defective trunk.
Figure 12:
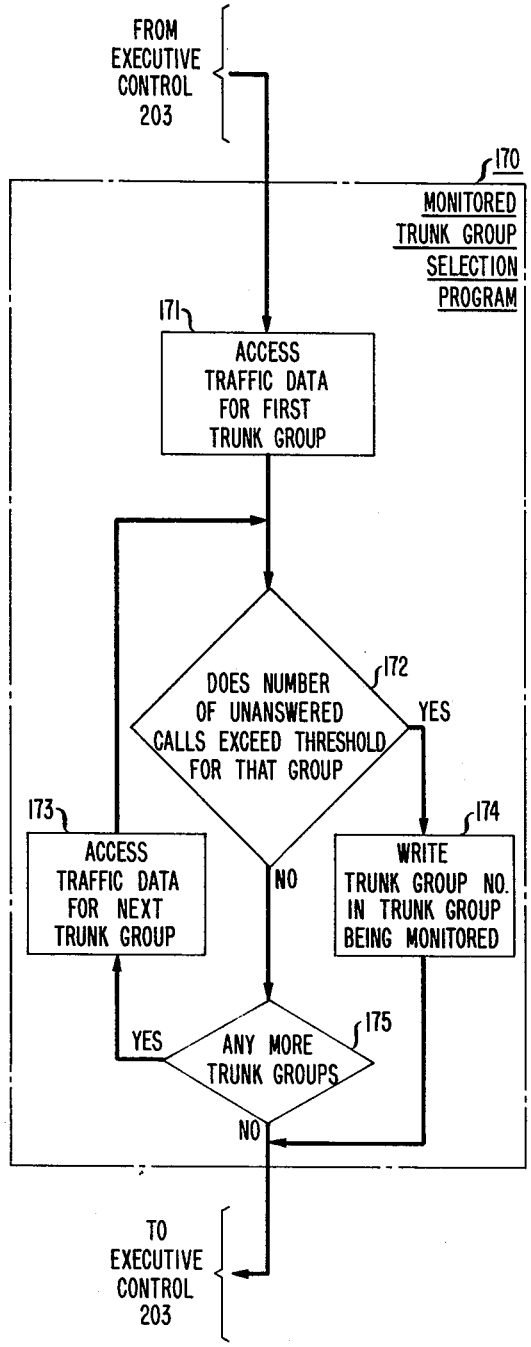
FIG. 12 is a flow chart of a program to identify a trunk group whose individual trunks are to be monitored.
Figure 13:
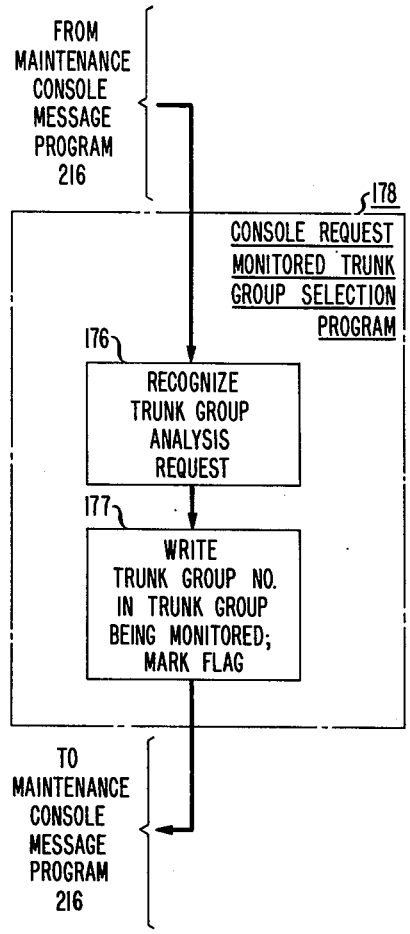
FIG. 13 is a flow chart of a program to respond to a command to monitor a specified group.

FIGS. 4 through 13 show program flow charts and memory layouts for implementing the present invention in the switching system described in the preceding paragraph. Included are the detection and counting of unanswered calls in a trunk group, the taking of measurements of individual members of a trunk group, the communication of results to the maintenance console, and the console of monitoring of a trunk group from the maintenance console. The flow charts are shown as connected to the flow charts of prior art programs discussed above with reference to FIG. 3. The program flow charts outline programs for controlling the accumulation of trunk group counts of unanswered calls and individual trunk counts of unanswered calls for one such group (FIG. 7); accumulation of counts of attempts to use each trunk in one group (FIG. 8); measurement of usage of each trunk in one group (FIG. 9); printing of trunk group unanswered call data, and of traffic data for the individual trunks of one group (FIG. 11); automatic selection of a trunk group to be monitored (FIG. 12); and selection of such a group on the basis of a command entered into the system (FIG. 13).

FIG. 4 is a layout 140 of memory required to accumulate counts and measurements for individual trunks of one trunk group being monitored. A trunk group being monitored is one for which individual trunk counts and measurements are so accumulated. Each word contains three counters, one to accumulate call attempts, one to accumulate a count of the number of times that a trunk is in use when sampled (usage count), and one to accumulate a count of the unanswered calls on that trunk. The block of memory has room for n trunks, the measurements for the first trunk occupying the first word. The n'th trunk occupying the last or n'th word. If an event is detected by the system for the m'th trunk in the group being monitored, then the appropriate counter (141, 142, or 143) in the m'th word is incremented.

For convenience in this particular implementation, only one such block (140) of memory is used per switching system. The address of this block (140) may then be fixed as a parameter of the system, and the length of the block may either be some convenient maximum for a particular class of switching systems, or it may be a standard maximum representing the largest trunk group which is serviced by such systems. It is also possible to provide several such blocks of memory and to monitor several trunk groups simultaneously.

FIG. 5 shows a memory layout 119 of common variable data for a trunk group. Included are storage 129 for counting the number of attempts to use trunks in the group, storage 128 for counting the number of unanswered calls in the group, and storage 127 for retaining a threshold representing the normal maximum number of unanswered calls for that group.

FIG. 6 shows a memory layout for storing the identification number of the trunk group being monitored (139) and for storing a flag indicating that the group is being monitored in response to a maintenance request (138). Whenever a call attempt or unanswered call is detected, a check is made of whether the event has occurred in the trunk group whose identification number is stored in 139; if so, an appropriate counter in block 140 (FIG. 4) is incremented. The flag is retained to distinguish an automatically initiated trunk group monitoring request from one that has been initiated in response to a command entered from the maintenance console 105; this is discussed further with reference to FIG. 13.

Figure 7:
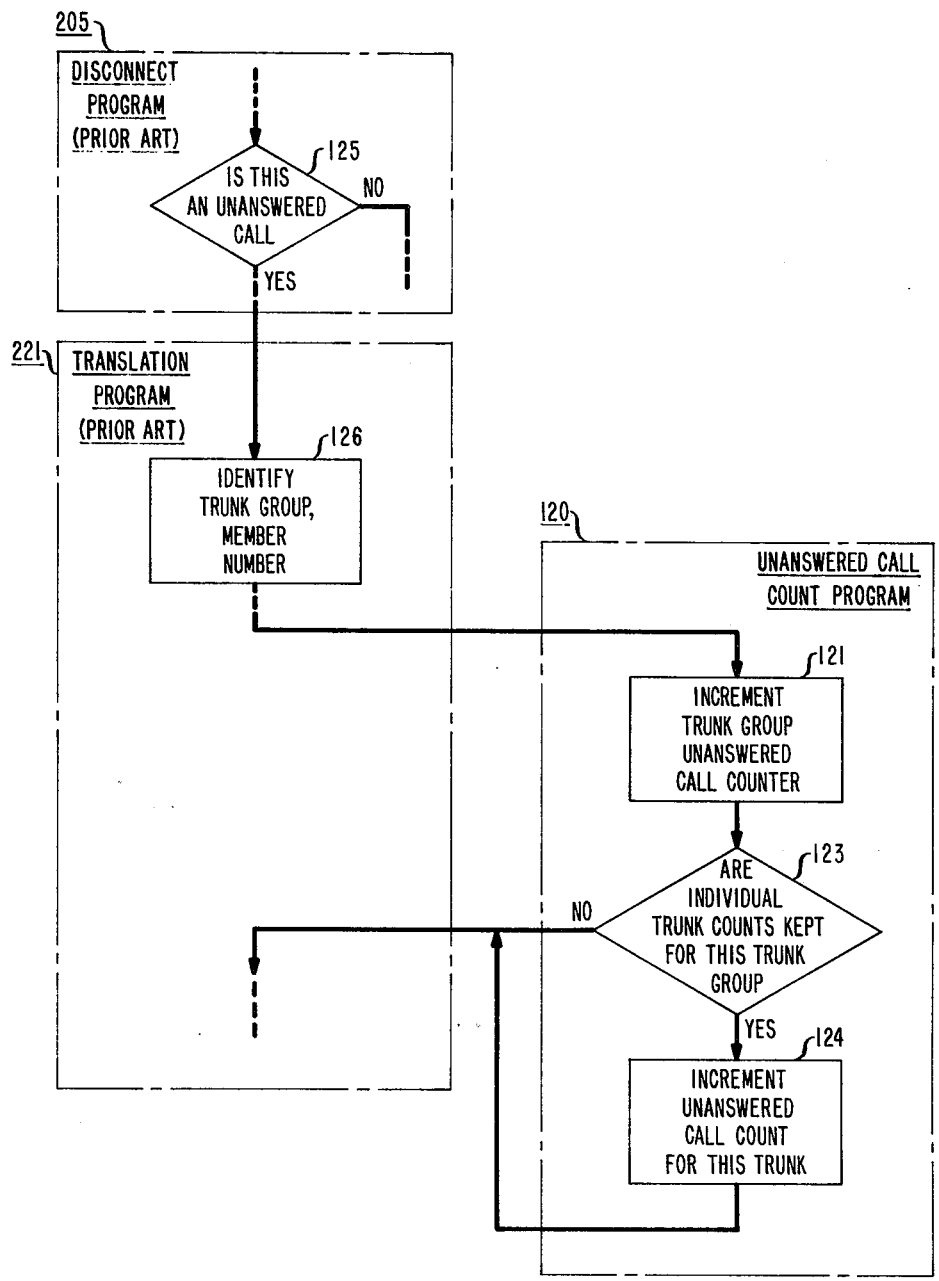
FIG. 7 is a flow chart representing a program for accumulating counts of unanswered calls.

FIG. 7 is a flow chart representing programs required to count unanswered calls. Included is a section of disconnect program 205 and translation program 221 of FIG. 3. When an unanswered call is detected by means of a conditional transfer instruction represented by block 125 in the disconnect program 205, a transfer is executed to a subroutine in translation program 221. Under the control of program 221, as represented by block 126, data particular to this switching system, known as translation data, is accessed to read the identification number of the trunk group and the member number within that trunk group associated with the trunk on which the unanswered call was detected. Program 221 is modified to cause the central processing unit to execute a transfer instruction to subroutine 121 in unanswered call count program 120. Unanswered call count program 120, consisting of subroutines 121, 123, and 124, increments the counter 128 (FIG. 5) associated with the trunk group, and, if the trunk group is being monitored, increments individual trunk unanswered call counters in block 140 (FIG. 4). Under the control of subroutine 121, the count of unanswered calls in the trunk group in counter 128 is incremented. Next, subroutine 123 is executed, under whose control a comparison is made, between the trunk group identification number, or trunk group number, and the number of the trunk group being monitored, the latter stored in memory location 139 (FIG. 6). If the comparison yields a match, a transfer is executed by central processing unit 101 to a subroutine 124 to control the incrementing of the unanswered call count for that trunk. The member number of the trunk was previously found under the control of translation program 221; if this number is m, then the unanswered call count 143 (FIG. 4) of the m'th trunk is incremented.

Data on unanswered calls of various trunk groups may also be combined with similar data from other switching systems. Data showing that many systems experience a high rate of unanswered calls to a particular switching system, may be used to identify problems in common equipment in that system.

Figure 8:
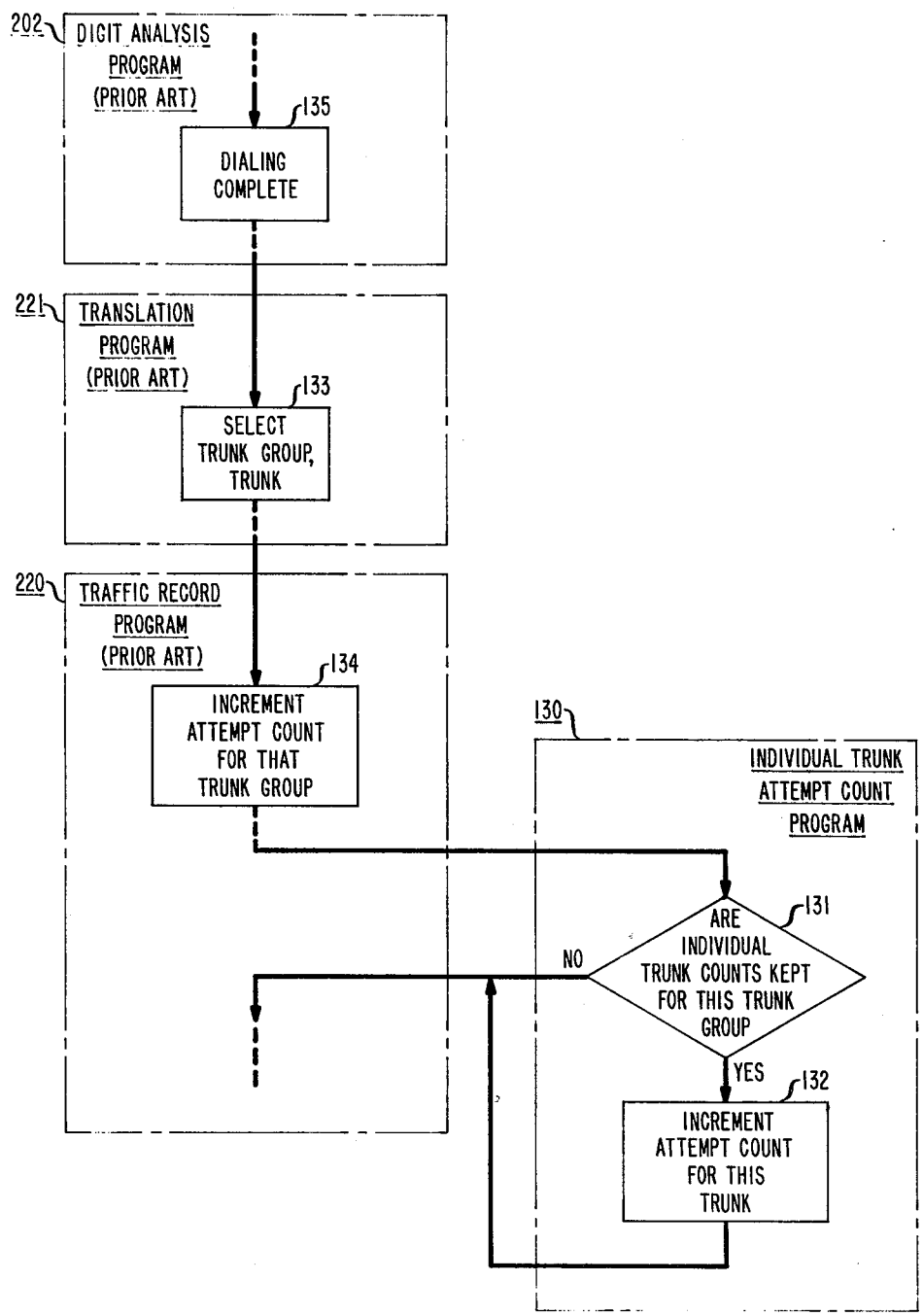
FIG. 8 is a flow chart of a program to accumulate attempt counts for an individual trunk within a trunk group.

FIG. 8 is a flow chart of programs for taking measurements of attempts to use the individual members of the trunk group being monitored. The flow chart includes sections of digit analysis program 202, translation program 221, and traffic record program 220 of FIG. 3. When the completion of dialing has been recognized under the control of subroutine 135 of digit analysis program 202, subroutine 133 of the translation program 220 is called to control the selection of an appropriate trunk group and the member number of an available trunk within that group. Subroutine 134 of the traffic record program 220 is then called to control the incrementing of attempt counter 129 for the selected trunk group. Traffic record program 220 is modified to cause central processing unit 101 to execute a transfer to individual trunk attempt count program 130. Individual trunk attempt count program 130 comprises two subroutines, 131 and 132. Subroutine 131 controls the check to see if the trunk group for this call is the same as the trunk group being monitored. Central processing unit 101 compares the identification number of the selected trunk group with the identification number of trunk group being monitored 139 (FIG. 6). If the comparison yields a match, central processing unit 101 executes a transfer to subroutine 132; under the control of subroutine 132, the attempt count 141 (FIG. 4) corresponding to the member number of the selected trunk is incremented. Subsequently, or if the comparison yielded no match, central processing unit 101, executes a transfer to traffic record program 220, under whose control other traffic record work is completed.

Figure 9:
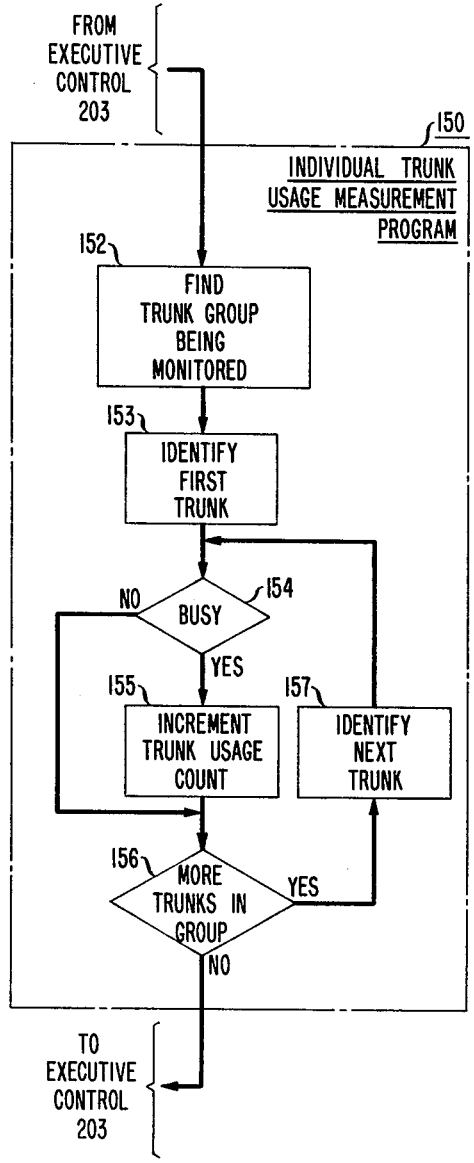
FIG. 9 is a flow chart of a program required to measure usage in the trunks of one trunk group.
Figure 10:
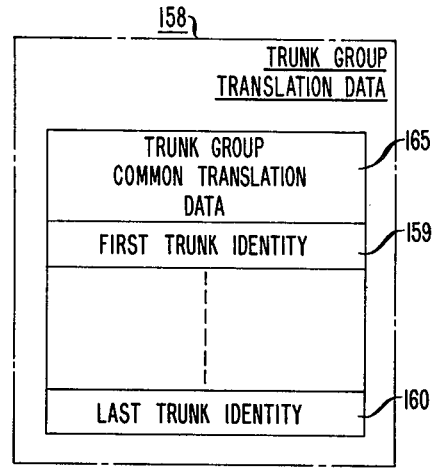
FIG. 10 shows the memory layout for a trunk group for identifying all the trunks within a group.

FIG. 9 is a flow chart of individual trunk usage measurement program 150. The central processor unit 101 in executing this program accesses trunk group translation data 158 (FIG. 10). This block of data, included in existing switching systems, is described, for example, in W. Ulrich et al.: "Translations in the No. 1 ESS", *The Bell System Technical Journal*, Vol. 43, No. 5, Part 2, pp. 2533–2573, (September, 1964). Trunk group translation data 158 includes data 165 common to all members of the group. Trunk group translation data 158 also includes the identification number of all trunks in the group, from the first member, whose identity is stored in location 159, to the last member, whose identity is stored in location 160. The identification numbers of the trunks are used to access data concerning the present state (busy or idle) of each trunk; trunk identification numbers for trunks should not be confused with member numbers, which simply correspond to the position of a trunk identification number within the list in block 158, or within the sets of counters in block 140 (FIG. 5).

Central processing unit 101, under the control of executive control program 203, generates a signal approximately once every 100 seconds. Executive control program 203 is modified so that this signal causes an execution of a transfer instruction to the initial subroutine 152 of the individual trunk usage measurement program 150 (FIG. 9). Under the control of subroutine 152, the identity of the trunk group being monitored, stored in location 139, is read, and is used to access trunk group translation data 158 (FIG. 10). Under the control of subroutine 152, central processing unit 101 accesses data block 158; it then reads the identity 159 of the first trunk in the group by executing subroutine 153. Under the control of subroutine 154, a check is made to see if the trunk is busy: if so, subroutine 155 controls the incrementing of the usage counter in block 140 corresponding to that trunk. Subsequently, the central processing unit 101 under the control of subroutine 156 accesses the trunk group translation data 158 to check if there are more trunks in the group. The identity of the next trunk is read under the control of subroutine 157 by accessing data block 158 and the loop consisting of subroutines 154, 155, 156, and 157 is repeated. This process is continued until the last trunk identity 160 is read, after which the loop check of subroutine 156 indicates the completion of individual trunk usage measurement program 150. This leads to the execution by the central processing unit 101 of a transfer instruction returning control of central processing unit 101 to the executive control program 203.

FIG. 11 is a flow chart of special traffic data print program 163 for controlling the communication of data generated by executing programs 120, 130, and 150 (FIGS. 7-9) to the maintenance console 105. Maintenance console message programs 216 are well known in the art. Maintenance console message program 216 is modified so that periodically it causes central processing unit 101 to execute a transfer to special traffic data print program 163. Special traffic data print program 163 comprises two subroutines 161 and 162. Subroutine 161 controls the setting up of data to control the printing of the number of unanswered calls stored in locations 128 (FIG. 5) associated with each of the trunk groups in the switching system. Subroutine 162 controls the setting up of data to control the printing of the contents of the counters of block 140 (FIG. 6) representing attempts, usage counts, and unanswered calls of all the trunks in the group being monitored. Various subroutines of maintenance message control program 216 subsequently control the printing at the maintenance console 105 of data set up by special traffic data print program 163. While the program flow charts indicate that the data is being printed, alternate forms display or recording, including use of video terminals, and/or recording on bulk storage for subsequent processing or display, and/or the transmission of such data to a remote location, are also possible.

FIG. 12 is a flow chart of the monitored trunk group selection program 170. It will be recalled that the trunks of a group to be monitored are individually measured using the counters 140 (FIG. 4). The function of the program 170 is to select for subsequent monitoring, a trunk group whose number of unanswered calls exceeds a prespecified threshold. Trunk group variable data 119 (FIG. 5) comprises counters 128 for counting the number of unanswered calls in that trunk group and storage 127 for retaining a threshold of the normal maximum number of such calls for the group. This threshold is prespecified as part of the translation information of the switching system. The threshold could also be automatically calculated using an algorithm based on the size of the trunk group or derived from a table specifying the threshold as a function of the size of the group; it could also be changed by a message from the maintenance console.

Central processing unit 101, under the control of executive control program 203 generates a signal approximately once every hour. Executive control program 203 is modified so that this signal causes a transfer instruction to be executed, transferring control to the monitored trunk group selection program 170 (FIG. 12). Under the control of the initial subroutine 171 within program 170, data stored in locations 127 and 128 (FIG. 5) associated with the first trunk group in the switching system is accessed. Under the control of subroutine 172, the two values are compared; if the number of unanswered calls 128 exceeds the threshold 127 for that group, a transfer to subroutine 174 is executed by central processing unit 101; then that group will be monitored during the next one hour interval. A group is monitored when its identification number is written into location 139 (FIG. 6) by the central processing unit 101 under the control of subroutine 174. If the number of unanswered calls in equal to or less than the threshold, a test controlled by subroutine 175 is carried out to check whether there are more trunk groups; if there are, traffic data for the next trunk group is accessed under the control of subroutine 173, and the loop for checking trunk groups to select a group to be monitored, comprising subroutines 172, 175 and 173, is reentered. Program 170 is terminated when a trunk group has been selected and its identity recorded by subroutine 174, or when no more trunk groups exist in the office as indicated by the check controlled by subroutine 175; under the control of subroutine 175 or subroutine 174, the central processing unit 101 then executes a transfer back to executive control program 203 which will control subsequent central processing unit operations.

In order to handle a situation in which an office has a significant number of badly maintained trunk groups, it may be desirable to ensure that the automatically initiated trunk group monitor selection process does not always pick the first of the defective trunk groups. It may, therefore, be desirable to arrange that the selection process of program 170 be modified to examine all trunk groups, but to start the search from a randomly selected trunk group or from the trunk group next after the trunk group previously monitored.

FIG. 13 is a flowchart of console request monitored trunk group selection program 178, for controlling the selection of a trunk group to be monitored by an input message from a maintenance console. This input message includes the identification number of the trunk group to be monitored. Maintenance console message program 216 is modified to include the recognition of a new message type representing this input message. Recognition of this message type causes a transfer to be made to console request monitored trunk group selection program 178.

Program 178 comprises two subroutines 176 and 177. Subroutine 176 is required to recognize details of the new type of message, representing the request to monitor a specified trunk group. Under the control of subroutine 176, subroutine 177 is called to control initiation of the monitoring by causing the number of the trunk group to be written in location 139 and to control the marking of maintenance request flag 138 (FIG. 6). Under the control of subroutine 177, a transfer is then executed to return control to maintenance console message program 216 which controls processing of further input messages.

Preference is given to maintenance requests over automatically generated requests by marking the maintenance request flag 138. This flag is cleared whenever the trunk group being monitored on the basis of a maintenance request is no longer so being monitored. When the flag is marked, no trunk group will be monitored through selection by monitored trunk group selection program 170 (FIG. 12), since preference is given to requests from the maintenance console.

It is to be understood that the hereinbefore described arrangements are illustrative of a specific application of the principles of the invention. In light of this teaching, it is apparent that numerous other arrangements may be devised by those skilled in the art without departing from the spirit and scope of the invention. For example, it may be possible to arrange that the monitoring of a specific trunk group be automatically initiated whenever certain thresholds for ratios of unanswered calls to total attempts as a function of the size of the trunk group are exceeded. It may be similarly desirable to be able to monitor more than one trunk group in an office. It may also be desirable to monitor trunks in a group over two different time periods, for example, quarter-hourly and hourly. It may be desirable to focus attention on only certain classes of unanswered calls such as those in which there has been an acknowledgement of receipt of outpulsing information by the connected switching system. It will be apparent to those skilled in the art that the invention may also be applied to data calls and to data switching systems and generally may be applied to any network having nodes and communications between the nodes.

What is claimed is:

1. In a program-controlled system controlling a node of a network and having groups of functional circuits used for communicating between the nodes of said network, a method of identifying a group of functional circuits recurrently engaged in unsuccessful communications comprising the steps of:
   1. detecting disconnect requests for each of said groups of functional circuits;
   2. in response to said step of detecting disconnect requests, disconnecting the communications associated with each of said requests;
   3. in response to said step of detecting disconnect requests, detecting unacknowledged communications in each of said groups of functional circuits; and
   4. in response to said step of detecting unacknowledged communications, measuring the number of unackowledged communications in each of said groups, whereby a group of functional circuits recurrently engaged in unsuccessful communications is identified by a measure substantially higher than that of other groups of similar size.

2. The method of claim 1 in which said program-controlled system further comprises storage means associated with each of said groups of functional circuits, and in which said step of measuring further comprises the steps of:
   1. counting the number of unacknowledged communications in each of said groups;
   2. recording the number of unacknowledged communications in each of said groups in said associated storage means; and
   3. displaying the contents of said associated storage means.

3. In a program-controlled system controlling a node of a network and having groups of functional circuits used for communicating between the nodes of said network, each of said groups having an associated storage means, a method of identifying a group of functional circuits recurrently engaged in unsuccessful communications comprising the steps of:
   1. detecting a disconnect request in any of said groups of functional circuits;
   2. in response to said step of detecting a disconnect request, disconnecting the communication associated with said disconnect request;
   3. in response to said step of detecting a disconnect request, detecting an unacknowledged communication in any of said groups of functional circuits;
   4. adjusting the contents of said storage means associated with the group for which an unacknowledged communication was detected in step 3;
   5. repeating steps 3 and 4 throughout an interval of time;
   6. measuring the rate of unacknowledged communications for each of said groups by comparing the contents of said associated storage means at the beginning and end of said interval, whereby a group of functional circuits recurrently engaged in unsuccessful communications is identified by a measure substantially higher than that of other groups of similar size.

4. The method of claim 3 in which each of said associated storage means comprises a counter; in which said step of adjusting comprises the step of incrementing said counter; and in which said step of measuring comprises the step of displaying the contents of said counter at the end of said interval.

5. The method of claim 4 further comprising the step of defining a threshold for a normal maximum number of unacknowledged communications in said interval of time for each of said groups; and in which said step of displaying further comprises the steps of:
   1. comparing the contents of said associated counters with said threshold at the end of said interval; and
   2. displaying the contents of said associated counters at the end of said interval for each group for which the contents of said counter exceed said threshold of said group, whereby a group of functional circuits recurrently engaged in unsuccessful communications is identified by a counter higher than said threshold for such a group.

6. In a program-controlled system controlling a node of a network and having groups of functional circuits used for communicating between the nodes of said network, each of said groups having an associated counter, and also having a set of counters for recording events for each functional circuit within a group, a method of identifying defective functional circuits recurrently engaged in unsuccessful communications comprising the steps of:

15

1. defining a threshold for a normal maximum number of unacknowledged communications in a unit of time for each of said groups;
2. detecting an unacknowledged communication in any of said groups of functional circuits;
3. incrementing the counter associated with the group for which an unacknowledged communication was detected in step 2;
4. repeating steps 2 and 3 throughout an interval of time equal to said unit of time;
5. at the end of said interval, selecting a group for which the threshold is less than the contents of the counter associated therewith;
6. detecting and counting in said set of counters the number of attempts to use each functional circuit in said selected group for a second interval of time;
7. recording the identity of functional circuits for which the attempt count for said second interval of time is substantially higher than that of others in said selected group.

7. The method of claim 6 in which said system further comprises a second set of counters, further comprising the steps of:
1. detecting and counting in said second set of counters the number of unacknowledged communications in each functional circuit in said selected group for said second interval of time; and
2. recording the identity of functional circuits for which the unacknowledged communication count is substantially higher than that of others in said selected group.

8. The method of claim 6 in which said system further comprises a second set of counters, further comprising the steps of:
1. measuring the percent of usage of each functional circuit in said selected group in said second set of counters for said second interval of time; and
2. recording the identity of functional circuits whose percent of usage is substantially lower than that of other functional circuits in said selected group with comparable attempts to use count.

9. The method of claim 8 in which said system further comprises a third set of counters, further comprising the steps of:
1. detecting and counting in said third set of counters the number of unacknowledged communications in each functional circuit in said selected group for said second interval of time; and
2. recording the identity of functional circuits in said selected group whose unacknowledged communications count is substantially higher than that of other functional circuits in said selected group.

10. In a program-controlled system controlling a node of a network and having groups of functional circuits used for communicating between the nodes of said network, each group having a unique identification number, and also having a set of counters, a method of identifying defective functional circuits within one of said groups, comprising the steps of:
1. selecting a group to be monitored;
2. storing the identification number of said selected group to be monitored;
3. selecting a group as part of the process of setting up an internodal communication path;
4. selecting an available functional circuit within said group selected in step 3;
5. comparing the identification number of said group selected in step 3 with the identification number of said group selected in step 1;
6. incrementing a counter of said set of counters corresponding to said selected functional circuit if the identification numbers of the groups selected in step 1 and step 3 match;
7. repeating steps 3 through 6 throughout an interval of time; and
8. recording the contents of said set of counters at the end of said interval of time, whereby a defective functional circuit is identified by a count substantially higher than that of other functional circuits in said group selected in said first step.

11. The method of claim 10 in which said system further comprises a second set of counters, further comprising the steps of:
1. measuring the percent of usage of each functional circuit in said selected group to be monitored in said second set of counters for said interval of time;
2. recording the contents of said usage measurements at the end of said interval of time, whereby a defective functional circuit is further identified by a percent of usage that is lower than that of other functional circuits with comparable attempts to use count in said selected group to be monitored.

12. The method of claim 10 in which said system further comprises a second set of counters, further comprising the steps of:
1. detecting and counting the number of unacknowledged communications in each functional circuit of said selected group to be monitored in said second set of counters throughout said interval of time; and
2. recording the contents of said second set of counters at the end of said interval of time, whereby a defective functional circuit is further identified by a count of unacknowledged communications substantially higher than that of other functional circuits in said selected group to be monitored.

13. The method of claims 10, 11, or 12 in which said step of selecting a group to be monitored further comprises the step of entering a command comprising the identification number of said group to be monitored into said program-controlled system.

14. In a program-controlled system comprising a call control processor system controlling a node of a network and having groups of functional circuits used for communicating between the nodes of said network, said call control processor system comprising: means for identifying a group containing functional circuits recurrently engaged in unsuccessful internodal communications comprising:
means for detecting disconnect requests in each of said groups;
means responsive to said means for detecting disconnect requests, for disconnecting the communications associated with said disconnect requests;
means, responsive to said means for detecting disconnect requests, for detecting unacknowledged communications in each of said groups; and
means, responsive to said means for detecting unacknowledged communications, for measuring the number of unacknowledged communications in each of said groups, whereby a group having a measure substantially higher than that of similar size groups is identified as a group containing functional circuits recurrently engaged in unsuccessful internodal communications.

15. The invention of claim 14 in which said means for measuring further comprise:
   means associated with each of said groups for counting the number of unacknowledged communications in said associated group; and
   means for displaying said counts.

16. In a program-controlled system controlling a node of a network and having groups of functional circuits used for communicating between the nodes of said network, means for identifying a group containing functional circuits recurrently engaged in unsuccessful internodal communications comprising:
   clock means for generating clock signals defining an interval of a unit of time;
   means for detecting disconnect requests in each of said groups;
   means, responsive to said means for detecting disconnect requests, for disconnecting the communications associated with said disconnect requests;
   means, responsive to said means for detecting disconnect requests, for detecting unacknowledged communications in any group of functional circuits and generating a signal;
   storage means associated with each of said groups;
   means responsive to said signal for adjusting contents of said storage means for each detected unacknowledged communication in the associated group during said interval of time; and
   means for measuring the rate of unacknowledged communications for each of said groups by comparing the contents of said storage means at the beginning and end of said interval, whereby a group having a measure of a greater number of unacknowledged communications than that of similar size groups is identified as a group containing functional circuits recurrently engaged in unsuccessful internodal communications.

17. The system of claim 16 in which each of said associated storage means comprises counter means; in which said means for adjusting comprises means for incrementing said counter means; and in which said means for measuring comprises means for displaying the contents of said counter means.

18. The system of claim 17 further comprising second storage means for storing a threshold defining a normal maximum number of unacknowledged communications for said interval of time for each of said groups; and in which said means for displaying further comprise means for identifying any groups for which the contents of said counter means exceed the number defined by said threshold, and means for displaying the identities of the identified groups.

19. In a program-controlled system controlling a node of a network and having groups of functional circuits used for communicating between the nodes of said network, each of said groups having a unique identification number, means for identifying functional circuits recurrently engaged in unsuccessful internodal communications comprising:
   clock means for generating clock signals defining first and second intervals of time;
   means for detecting unacknowledged communications in any group of functional circuits and generating a signal;
   first counter means associated with each of said groups responsive to said signal for counting the number of unacknowledged communications in said associated group occurring during said first interval;
   first storage means for storing a threshold defining a normal maximum number of unacknowledged communications for an interval of time equal to said first interval for each of said groups;
   means for comparing the contents of said first counter means for each of said groups with said threshold for each of said groups;
   means for selecting to be monitored one of said groups for which the contents of said counter means exceed said threshold for said group;
   second storage means for storing the number of said selected group to be monitored;
   means for selecting a group to be used for an internodal communication and means for selecting an available functional circuit within said selected group to be used for said internodal communication;
   means for comparing the identification number of said selected group to be monitored with the identification number of said selected group to be used for said internodal communication and generating a match signal when said comparison yields a match;
   second counter means responsive to said match signal for counting during said second interval of time, the number of times each functional circuit of said selected group to be monitored is used; and
   means for recording the contents of said second counter means at the end of said second interval of time, whereby a defective functional circuit is identified by a count of attempts to use in said second counter means substantially higher than that of other functional circuits in said selected group to be monitored.

20. The system of claim 19 further comprising:
   means for detecting unacknowledged communications in said selected group to be monitored;
   additional counter means for counting during said second interval the number of unacknowledged communications in each functional circuit of said selected group to be monitored; and
   means for recording the contents of said additional counter means at the end of said second interval of time, whereby a defective functional circuit is further identified by a count in said additional counter means substantially higher than that of other functional circuits in said selected group to be monitored.

21. The system of claim 19 further comprising:
   means for measuring during said second interval of time, the percent of usage of each functional circuit in said selected group to be monitored; and
   means for recording the contents of said means for measuring at the end of said second interval of time, whereby a functional circuit having a percent of usage that is substantially lower than that of other functional circuits in said selected group to be monitored with comparable counts of attempts to use is further identified as defective.

22. In a program-controlled system controlling a node of a network and having groups of functional circuits used for communicating between the nodes of said network, each of said groups having a unique identification number, means for identifying defective functional circuits within one of said groups, said means comprising:

clock means for generating clock signals defining an interval of time;

means for selecting a group to be monitored;

means for storing the identification number of said selected group to be monitored;

means for selecting a group to be used for an internodal communication and means for selecting an available functional circuit within said selected group to be used for said internodal communication;

means for comparing the identification number of said selected group to be monitored with the identification number of said selected group to be used for said internodal communication and for generating a match signal when said comparison yields a match;

counter means responsive to said match signal for counting, during said interval of time, the number of times each functional circuit in said selected group to be monitored is used; and means for recording the contents of said counter means at the end of said interval of time, whereby a defective functional circuit is identified by a count of attempts to use substantially higher than that of other functional circuits in said selected group to be monitored.

23. The system of claim 22 further comprising:

means for measuring during said interval of time, the percent of usage of each functional circuit in said selected group to be monitored; and means for recording the contents of said means for measuring at the end of said interval of time, whereby a functional circuit having a percent of usage that is substantially lower than that of other functional circuits with comparable counts of attempts to use in said selected group to be monitored is further identified as defective.

24. The system of claim 22 further comprising:

means for detecting unacknowledged communications in said selected group to be monitored;

additional counter means for counting, during said interval of time, the number of unacknowledged communications in each functional circuit of said selected group to be monitored; and means for recording the contents of said additional counter means at the end of said interval of time, whereby a defective functional circuit is further identified by a count in said additional counter means substantially higher than that of other functional circuits in said selected group to be monitored.

25. The system of claims 22, 23, or 24 in which said means for selecting a group to be monitored comprises means for accepting a command comprising the identification number of said group to be monitored.

26. In a telecommunication network having a plurality of switching systems and a plurality of groups of trunks for interconnecting said switching systems, a program-controlled switching system comprising:

clock means for generating clock signals defining an interval of time;

means for detecting disconnect requests in each of said groups;

means, responsive to said means for detecting disconnect requests, for disconnecting the communications associated with said disconnect requests;

means, responsive to said means for detecting disconnect requests, for detecting unacknowledged communications in any group of trunks and generating a signal;

storage means associated with each of said groups;

means responsive to said signal for adjusting contents of said storage means for each detected unacknowledged communication in the associated group during said interval of time; and means for measuring the rate of unacknowledged communications for each of said groups by comparing the contents of said storage means at the beginning and end of said interval, whereby a group having a measure of a greater number of unacknowledged communications than that of similar size groups is identified as a group containing trunks recurrently engaged in unsuccessful communications.

27. The system of claim 26 in which each of said associated storage means comprises counter means; in which said means for adjusting comprises means for incrementing said counter means; and in which said means for measuring comprises means for displaying the contents of said counter means.

28. The system of claim 27 further comprising second storage means for storing a threshold defining a normal maximum number of unacknowledged communications for said interval of time for each of said groups; and in which said means for displaying further comprise means for identifying any groups for which the contents of said counter means exceed the number defined by said threshold and means for displaying the identities of the identified groups.

29. In a telecommunication network having a plurality of switching systems and a plurality of groups of trunks for interconnecting said switching systems, each of said groups having a unique identification number, a program-controlled switching system comprising:

clock means for generating clock signals defining an interval of time;

means for selecting a group to be monitored;

means for storing the number of said selected group to be monitored;

means for selecting a group to be used for a communication and means for selecting an available trunk within said selected group to be used for said communication;

means for comparing the identification number of said selected group to be monitored with the identification number of said selected group to be used for said communication and for generating a match signal when said comparison yields a match;

counter means responsive to said match signal for counting, during said interval of time, the number of times each trunk in said selected group to be monitored is used; and means for recording the contents of said counter means at the end of said interval of time, whereby a defective trunk is identified by a count of attempts to use substantially higher than that of other trunks in said selected group to be monitored.

30. The system of claim 29 further comprising:

means for measuring the percent of occupancy of each trunk in said selected group to be monitored; and means for recording the contents of said means for measuring, whereby a trunk having a percent of occupancy that is substantially lower than that of other trunks in said selected group to be monitored with comparable counts of attempts to use is further identified as defective.

31. The system of claim 29 further comprising:
means for detecting unacknowledged communications in said selected group to be monitored;
additional counter means for counting, during said interval of time, the number of unacknowledged communications in each trunk of said selected group to be monitored; and
means for recording the contents of said additional counter means at the end of said interval of time, whereby a defective trunk is further identified by a count in said additional counter means substantially higher than that of other trunks in said selected group to be monitored.

32. The system of claims 29, 30, or 31 in which said means for selecting a group to be monitored comprises means for accepting a command comprising the identification number of said group to be monitored.

* * * * *

UNITED STATES PATENT AND TRADEMARK OFFICE
CERTIFICATE OF CORRECTION

PATENT NO. : 4,484,030

DATED : November 20, 1984

INVENTOR(S) : Charles D. Gavrilovich

It is certified that error appears in the above-identified patent and that said Letters Patent is hereby corrected as shown below:

In the Claims, Column 14, line 56, "is identified by a counter higher than" should read --is identified by a count higher than--.

Signed and Sealed this

Eleventh Day of June 1985

[SEAL]

Attest:

DONALD J. QUIGG

Attesting Officer

Acting Commissioner of Patents and Trademarks